United States Patent Office 2,796,671
Patented June 25, 1957

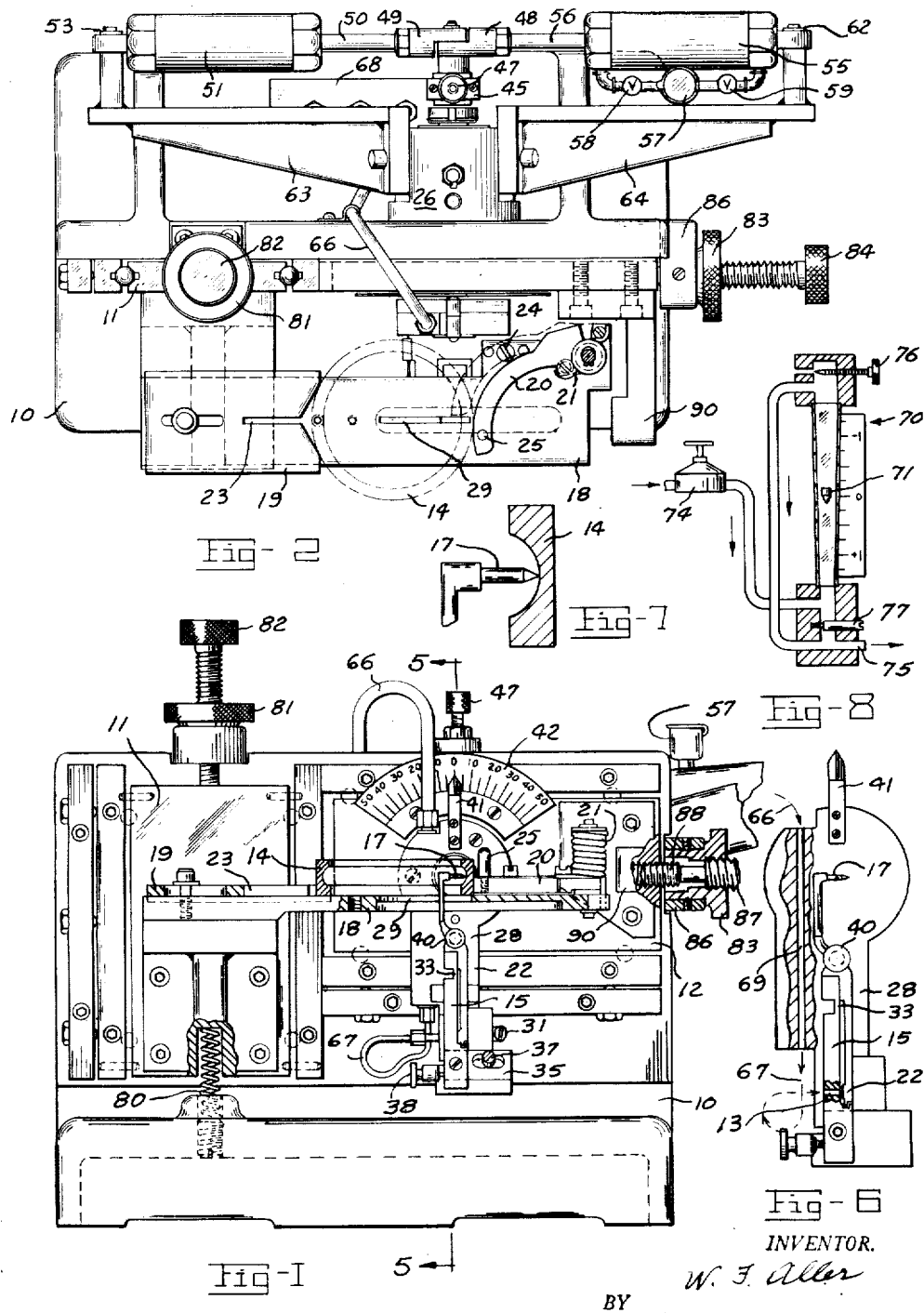

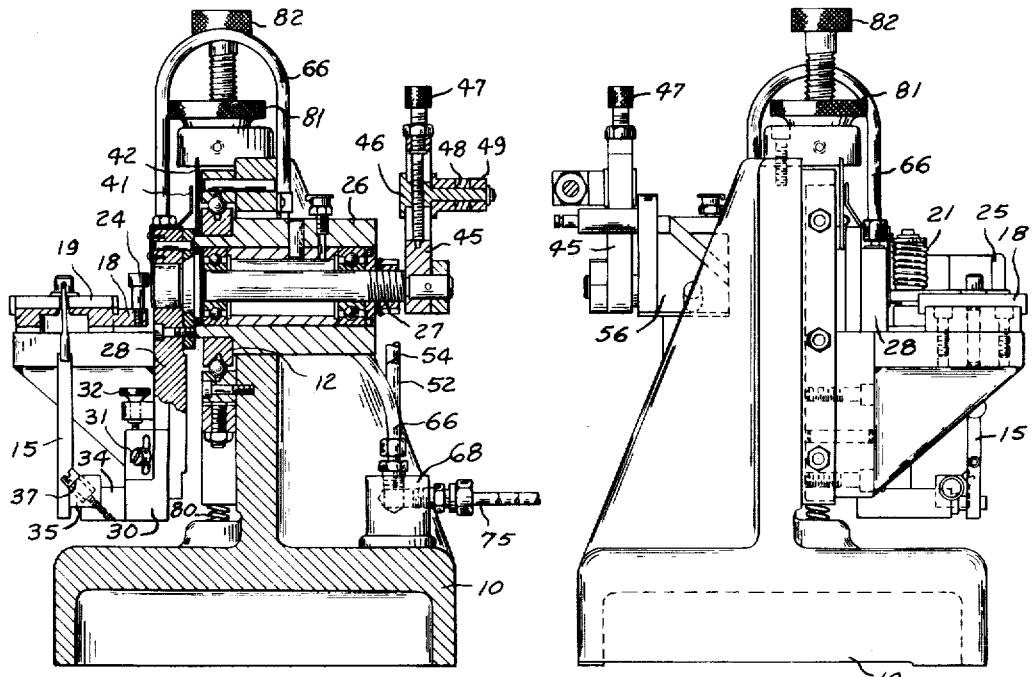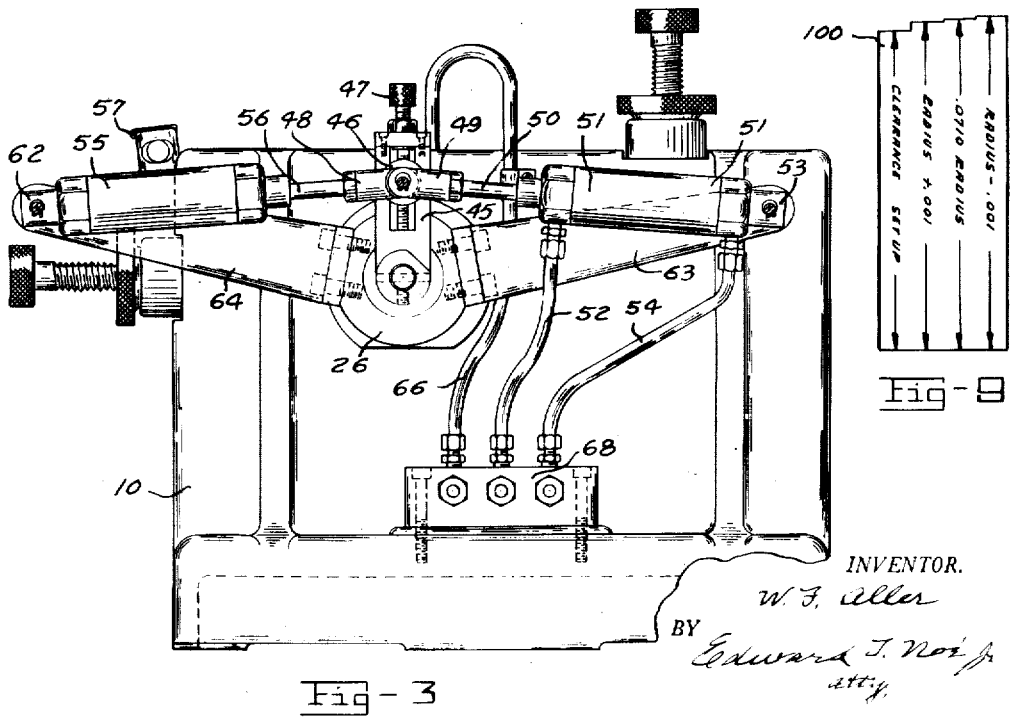

2,796,671

GAUGING DEVICE AND METHOD FOR CHECKING A RADIUS OF CURVATURE

Willis Fay Aller, Dayton, Ohio, assignor, by mesne assignments, to The Sheffield Corporation, a corporation of Ohio Application December 29, 1953, Serial No. 400,938

19 Claims. (Cl. 33—178)

This invention relates to a device for gauging the radius of an arcuately curved surface on a part.

It is the primary object of this invention to provide an apparatus for the rapid and accurate gauging of the radius of curvature of an arcuate surface on a part.

It is a further object to provide an apparatus wherein a gauging means is moved about a pivot axis while in association with an arcuate surface, and an indicating means is continuously and instantaneously responsive to the displacements between the surface and the pivot axis whereby through the characteristic responses of the indicating means the pivot axis can be located on the center of the curvature being gauged and the radius of the arcuate surface determined.

It is a further object of this invention to provide an apparatus of the character referred to which is adaptable for the gauging of part surfaces of a wide range of dimensions.

It is a further object to provide an apparatus for the gauging of the radius of curvature of an arcuate surface, which apparatus is simple and rugged in construction, is easily set up for gauging various parts and by which repeated accurate results can be obtained by inexperienced operators.

It is a further object to provide a method for accurately positioning the pivot axis of a swingable gauging contact concentrically with an arcuate surface on a part and precisely gauging the radius of curvature.

Additional objects and advantages of the invention will be apparent from the following description, the appended claims, and the accompanying drawings in which, Figure 1 is a front view of an illustrative embodiment of an apparatus including the features of the present invention, Figure 2 is a top view of the same apparatus, Figure 3 is a rear view of the apparatus, Figure 4 is an end view of the apparatus as viewed from the lefthand side of Figure 1, Figure 5 is a sectional view on line 5—5 of Figure 1, Figure 6 is a detail view of a gauge head and its carrying means shown in partial section, Figure 7 is a detail of the gauging contact in association with a bearing ring race, Figure 8 is a schematic view of an indicating device suitable for use with the exemplary apparatus disclosed, and Figure 9 discloses an illustrative setup block provided for a particular gauging application.

The apparatus of this invention is provided for gauging the radius of curvature of an arcuate surface. It has been disclosed as applied to gauging the radius of the transverse curvature of a bearing ring race; however, it will be understood that this application, while an important one, has been disclosed primarily for the purpose of illustrating the present invention and the invention would have application for gauging other curved surfaces.

In the disclosed embodiment a gauging head which includes a work contactor is carried for pivoting movement and is driven to oscillate the work contactor across the surface to be gauged. Gauging movements of the work contactor are along a radius passing through the pivot center. An indicating means is operatively associated with the gauging head to continuously indicate the gauging movements of the work contactor as it traverses the work surface. This apparatus is initially set up so that when the pivot center about which the work contactor oscillates coincides with the center of the particular surface curvature being gauged the apparatus will indicate the deviation of the radius being gauged from a reference radius. The gauge head and part are relatively adjusted as the work contactor swings across the arcuate surface until the pivot axis is centered on the center of the surface curvature to be gauged as indicated by the responses of the indicating means. An indication of the radius of the surface being gauged is then obtained.

In the specific example disclosed the outer ring of a ball bearing is positioned horizontally and is carried for vertical adjustment by a slide means. The gauge head comprises a fluid leakage orifice and an opposing orifice controlling surface positioned by a work contactor in accordance with the curvature of the surface being gauged, the orifice being connected to an air flow measuring instrument. The gauge head and its pivot drive means are both mounted upon a second slide means for horizontal adjustments. The pivoting movement is adjustable as to rate, extent and frequency.

Referring now to the drawing, it will be seen that the exemplary apparatus illustrated comprises a base 10 which carries a part supporting slide 11 for vertical adjustments and a horizontally adjustable slide 12 which supports the gauging means. The base 10 has a forward vertically disposed mounting face thereon. The vertical slide 11 carries the outer ring 14 of a ball bearing mounted upon a cantilevered support extending to the right as viewed in Figure 1.

A gauging head 15 is adjustably carried relative to the horizontal slide 12 for pivoting movement in a gauging operation. The gauge head 15 is of an air leakage type wherein the work controlled movements of a work contactor 17 pivot a swingable arm 22 about a reduced flexible section 33 to control, by means of a flow controlling surface, the flow out through an orifice 13. The orifice is suitably connected to a flow gauging instrument such as disclosed in Figure 8 which is mounted in a stationary position and continuously indicates the gauging movements of the work contactor 17.

The vertical slide 11 carries a loading plate 18 on which parts are placed for gauging. The loading plate in turn supports an adjustable V-block 19 which nests the part during gauging and an adjustable clamping arm 20 which is loaded by spring means 21 to keep the part securely in position. An adjustable stop pin 24 can be inserted into holes provided for that purpose in the upper surface of loading plate 18 to stop the clamping arm 20 from swinging too far inward when a part is not situated on the loading plate 18. A knob 25 is used to move the arm 20 to and from clamping position.

The horizontal slide 12 (refer now to Figure 5) mounts an extension 26 which extends rearwardly thereof and back through the base 10 with clearance for horizontal adjustments with the slide 12. This extension 26 carries a shaft 27 for pivoting movement therein. A plate 28 is fixed to shaft 27 at its lefthand end as viewed in Figure 5.

The gauge head 15 is carried for vertical and horizontal adjustment relative to the pivotally carried plate 28. At the lower end of the plate 28 a block 30 is carried for sliding therealong in a generally vertical direction. The block 30 is releasably clamped to the plate 28 by a screw-slot arrangement indicated at 31 and can be adjusted relative to the plate by a knurled knob 32. At the lower end of the block 30 a forward extension 34 carries a block 35 for adjustments in a generally horizontal direction. This block 35 is releasably clamped relative to the forward extension 34 through a screw-slot arrangement indicated at 37 and the block 35 can be horizontally adjusted by means of a knurled knob 38. Thus the gauge head 15 can be adjusted as desired relative to the pivotally carried plate 28. It will be noted that the gauge head 15 has a clamping knob 40 whereby different size work contactors can be mounted for various dimensioned parts.

The upper end of the plate 28 carries a pointer 41 which cooperates with a graduated scale 42 carried directly from the horizontal slide 12. Pointer 41 will indicate the degree of oscillation of the work contactor 17 and the movements of the work contactor 17 during the pivoting of the plate 28.

A crank arm 45 is fixed to the rear end of the shaft 27. The crank arm 45 is slotted along the upper portion of its length and a slide member 46 is adjustable along the crank arm by means of a knurled knob 47. The slide member 46 has a rearward extension to which two links 48 and 49 are journaled. The link 49 is connected through rod 50 to an air operated piston for oscillation of the crank arm 45 and the shaft 27. The link 48 is connected through rod 56 to an adjustable dampening device which is used as a cushion to enable the air operated piston to be operated at a higher pressure to achieve a smooth action. It will be seen that with a given stroke of the piston operating the link 49 adjustments of the slide member 46, through rotation of the knurled knob 47, will vary the effective radius of the crank arm and the degree of oscillation. The oscillaton is adjusted with a random part in position. The piston which operates the link 49 is carried in a cylinder 51 and is reciprocated therein by air which is supplied or exhausted through conduits 52 and 54. The outer end of the cylinder 51 is attached at 53 to an arm 63 carried from the rearward extension 26 mounted on the horizontal slide 12. A dampening piston is contained in a cylinder 55 and is connected through rod 56 to the link 48. Figure 2 illustrates the cylinder 55 and the conduits which are connected between its ends which are kept filled by an oil cup 57. Adjustable valves 58 and 59 are provided to vary the rate of flow in either direction to adjust the cushioning effect and rate of movement as is desired. The outer end of the cylinder 55 is attached at 62 to an arm 64 supported in the same manner from extension 26 as is the oppositely extending arm 63. It will be seen that the entire actuating and dampening structure is carried by the horizontal slide 12.

Air is supplied for gauging through a conduit 66 which leads to the upper end of a passage 69 through the plate 28 (see Figure 6). At the lower end of the passage 69 a flexible connection 67 leads to the aforementioned orifice 13 in the gauge head 15. Both the air for the oscillating drive and the air for gauging is supplied through a manifold 68 mounted on a rearward extension of the base 10. The conduits 52 and 54 leading to opposite ends of the cylinder 51 for the oscillating drive are connected to a commercially available valving mechanism whereby the oscillations can be carried out at an adjustable frequency.

The gauging air is supplied to manifold 68 through a suitable flow gauging instrument such as that indicated at 70 in Figure 8. This instrument is commercially available and is of the type wherein a float positions itself along the length of an internally tapered, transparent, vertically disposed flow tube in accordance with the rate of flow through the instrument, which is in turn controlled, in this example, by the clearance between the orifice controlling surface of the arm 22 and the orifice 13 included as gauging components in the gauge head 15. In the instrument 70 the indicating element is the float 71. Air is supplied to the instrument through a regulator 74 and passes vertically upward through the tube and down and out at the lower end of the instrument through a conduit 75 and to the manifold 68. A float positioning adjustment 76 is provided whereby a certain amount of air can be relieved to atmosphere after it has been passed through the vertically disposed tube of the instrument without going to the gauge head for positioning the float 71 as desired in setup operations. A further adjustment 77 is provided in a bypass passage to adjust the amount of air bypassed directly to the gaugehead without passing through the gauging instrument to thereby vary the amplification of the instrument.

As has been previously mentioned each of the slides 11 and 12 is adjustable. Referring to Figure 1 it will be seen that the slide 11 is urged upward by a spring 80 and is adjusted in its vertical positions by a large knob 81 (nearest the ball slide) for rapid coarse adjustments, and a smaller knob 82 is provided for fine adjustments. A similar coarse adjustment 83 and fine adjustment 84 are provided for the horizontal slide 12. The adjustments for both the vertical slide 11 and the horizontal slide 12 are similarly constructed and a description of that for the horizontal slide 12 will suffice for both. Referring to Figure 1 it will be seen that the coarse adjustment knob 83 is carried for rotation in but is held against axial movement relative to a forward extension 86 carried from the base 10. The knurled fine adjustment knob 84 serves to rotate a screw which has a coarsely threaded portion 87 threaded within the coarse adjustment knob 83 and a finely threaded portion 88 which is threaded within the righthand end of the horizontal slide 12. Thus, it is seen that upon rotation of the knob 83 (holding knob 84 against rotation) coarse adjustments will be achieved and upon rotation of the knob 84 (holding knob 83 stationary) fine adjustments will be accomplished.

At its righthand end, as viewed in Figure 1, the horizontal slide 12 carries a forward extension 90 which serves in cooperation with the vertical slide 11 and the loading plate 18 for a setup purpose later described.

It will be seen in Figures 1 and 5 that the arm carrying the work contactor 17 extends upward through a longitudinal slot 29 in the loading plate 18. Contactor 17 extends through the pivot center of the driver plate 28 and into contact with the race of the outer ring 14.

To illustrate one manner in which this apparatus can be set up for gauging, a gauge block 100 of a specific design for one unique application has been illustrated in Figure 9. This particular block is to be used with an indicating instrument such as that illustrated in Figure 8 which has a range of .002 of an inch. The block 100 is for setting up the gauging apparatus for gauging the actual race radius of a miniature bearing having a nominal race radius of 0.0710 inch.

With the setup block 100 the initial orifice clearance can be properly correlated with the float position of the instrument 70 to establish linearity; the amplification of the instrument can be set and adjusted; and the instrument 70 and gauge head 15 correlated for the gauging of the race radius. It will be seen that the upper end of the block 100 is stepped. The displacement between the step for the Clearance Setup and the Radius+.001 step is .002 of an inch, which is the necessary movement of contactor 17 to give a clearance of the controlling surface on the orifice controlling arm 22 relative to the orifice 13 at which the float 71 in the instrument 70 should be positioned opposite the "+1" calibration at the lower end of the instrument scale. The difference in displacements between the Radius+.001 step and the next two outward steps is .001 of an inch in each instance.

In setting up the apparatus the vertical slide 11 is raised until the clamping arm 20 can swing in without hitting the work contactor 17. The stop pin 24 is removed allowing the clamp arm 20 to swing in against plate 28. The vertical slide 11 is then lowered until the work contactor 17 passes through the slot 29 in the loading plate 18 and above the plate a slight distance such as ³⁄₁₆ of an inch. At this time the float positioning adjustment 76 of the instrument 70 should be adjusted until the float 71 is opposite the "0" on the instrument scale.

The setup master 100 is then placed on the loading plate 18 with its flat end against the setup block 90 and with the Clearance Setup line in line with the work contactor 17. The horizontal adjusting screw 38 is used to position the gauge head 15 relative to the plate 28 until the work contactor 17 is against the Clearance Setup face of the master block 100 as indicated by the float 71 rising approximately one graduation on the instrument scale. This insures that the contactor 17 is in good contact with the setup master 100. The plate 28 is oscillated manually to obtain the highest reading of the float 71 in the instrument 70 which will occur at the maximum inward displacement of the work contactor 17 by the setup block surface when the point of the contactor 17 is horizontally opposite the center of pivoting. At this time the pointer 41 should be at the zero point on the scale 42. If necessary the screw 31 can be released and the vertical adjustment knob 32 turned to raise or lower the gauge head 15 relative to the pivotally carried plate 28 until the highest float reading is obtained with the indicator 41 at zero on the scale 42. When this adjustment has been accomplished the contact of the work contactor 17 is horizontally opposite the pivot point at the midpoint of the oscillation and its movement is properly correlated with the pointer 41 and scale 42.

Keeping the pointer 41 at zero on the scale 42, the setup master 100 is slid until the work contactor 17 touches the Radius +.001 step on the master 100. This will open the orifice 13 the predetermined amount at which the float 71 should be positioned at the "+1" calibration on the scale of instrument 70. Accordingly, with the work contactor 17 at the Radius +.001 step on the master 100 the float positioning knob 76 is turned to position the float 71 at the "+1" calibration on the instrument scale.

The master 100 is then moved to where the contactor 17 engages the Radius —.001 step on the master. At this time the float 71 should rise to the "—1" calibration on the instrument scale and if it does the instrument 70 is properly adjusted as to amplification. If not, suitable adjustment of the float positioning knob 76 and amplification adjustment 77 can be made in correlation with the proper steps in the master 100 to set this amplification. The .0710 Radius step of the block 100 provides an additional check for linearity and when the work contactor 17 engages this step the float 71 should be at "0" on the scale of instrument 70. At this point if the axis of pivoting of the gauge head 15 is on the center line of the race curvature being gauged, the instrument 70 will indicate the race radius in a plus or minus sense with the nominal race radius at "0" on the instrument scale.

In preparation for an actual gauging operation the vertical slide 11 is raised to allow the clamping arm 20 to be swung out over the contactor 17. Stop pin 24 is properly positioned in one of the holes in the loading plate 18 to limit the inward movement of the clamping arm 20. Outer bearing rings are placed against the adjustable V-block 19 and over the contactor 17 as in the specific illustrated example. If inner ring races are to be gauged the rings are placed to the right of the contactor 17 and the adjustable V-block 19 is slid over until the contactor 17 extends up through the slot 23 in the block 19. In the illustrated example the block 19 is moved to contact the bearing ring 14 and is locked in place on the loading plate 18 with contactor 17 slightly away from the race surface. With the stop projection 24 properly adjusted on the loading plate 18, the clamping arm 20 can swing in to hold race 14 against the block 19 but the movement of the arm 20 is limited so it cannot swing over and impact the contactor 17.

The following procedure is followed in locating the pivot axis of the contactor 17 exactly on the center of the race curvature being gauged during a gauging operation.

First the horizontal slide 12 is adjusted by means of the knobs 83 and 84 until the contactor 17 engages the race and the float 71 rises approximately half way in the tube of the instrument 70. This establishes a rough horizontal adjustment. Then the vertical slide 11 is adjusted to position the float 71 as low as possible on the instrument scale. This condition could occur when the contactor 17 is at its farthest position to the right while following the race surface as viewed in Figure 1 and this establishes a rough vertical centering. These adjustments are made with pointer 41 at zero on scale 42.

Figure 7 is an enlarged view of the association of the contactor 17 with the race of an outer bearing ring 14. Assuming that the apparatus has been properly set up the contactor 17 will oscillate up and down about the center of its pivoting to equal angles in each direction. It will be seen that if the pivot center is, for example, above the center of the race curvature the work contactor movements and the responding movements of the indicator float 71 will be unequal upon oscillation of the contactor 17 above and below its pivot center. It will also be appreciated that if the pivot center is, for example, inward toward the race relative to its race center, that even if the pivot center were horizontally disposed relative to the race center the float 71 would move as the contactor is moved up and down over the race surface. These characteristics of the response of the float 71 are used in order to finally position the pivot center on the race curvature center.

To obtain this final positioning the automatic oscillation by means of the cylinder 51 and its air supply lines is set into operation. As contactor 17 oscillates the vertical slide 11 is positioned, by using its fine adjustment knob 82, to position the race relative to the pivot center of the gauge head 15 until equal float readings are obtained as contactor 17 oscillates the same distance either side of zero. This positions the pivot axis of shaft 27 horizontally in line with the race curvature center. Then while continuing to oscillate the contactor 17 the horizontal slide 12 is finely adjusted until a minimum float movement is obtained as the contactor 17 moves across the race. Thus the pivot center is also horizontally positioned relative to the race curvature center and is centered thereon. If the curvature of the race is prefectly arcuate about its curvature center there will be no float movement when the center of the race curvature and the pivot center coincide. At the point when a minimum float or indicator movement or no float movement at all is obtained the mean float position (or the float position if no motion occurs) will indicate the radius size, "0" on the scale of the instrument 70 being the nominal race radius.

It will be appreciated that while a particular type of gauging instrument 70 has been illustrated other instruments are available and can be employed.

Because of the unique cooperation between the pivotally carried gauging means and the continuously responsive and visible gauging indicator it can be readily determined when the pivot axis and curvature center coincide and what the radius of curvature is. Inexperienced operators can rapidly perform gauging operation with this apparatus because of the simplicity of the adjustments involved and the characteristic gauging indicator responses which are easily interpreted. Suitable adjustments and replaceable components are embodied in the apparatus to readily adapt it for part surfaces of a wide range of dimensions. With the relatively few, simply conformed components the apparatus will have a long useful service life and give repeated accurate gauging results.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. An apparatus for gauging the radius of an arcuate surface on a part comprising means for supporting a part in a gauging position, a gauging means, means carrying said gauging means for movements about a pivot axis and along the arcuate surface, said gauging means comprising means continuously responsive to the distance between the arcuate surface and the pivot axis during the movements of the gauging means about the pivot axis, said supporting means including means for adjustably positioning the part in a first direction transverse the pivot axis, said carrying means including means for laterally positioning the pivot axis in a direction at an angle to said first direction, whereby the pivot axis can be positioned coaxially with a center of curvature of the arcuate surface being gauged, and indicating means continuously responsive to said gauging means to determine when the pivot axis and surface center coincide and variations in the radius of curvature of the surface.

2. An apparatus for gauging the radius of an arcuate surface on a part, comprising a base, means for supporting a part to be gauged, gauging means including a gauging contact, means supporting said gauging means for oscillatory swinging of said gauging contact about a pivot axis and across the surface to be gauged and gauging movement in accordance with the distance between the pivot axis and the arcuate surface, said supporting means including adjustable means for relatively adjusting the part and pivot axis along relatively perpendicular paths to locate the pivot axis of the gauging means on a center of curvature of the surface, drive means operatively connected to the supporting means for the gauging means for automatic oscillation of said gauging means and said gauging contact, and indicating means operatively connected to said gauging means responsive to gauging movements of said gauging contact.

3. An apparatus for gauging the radius of an arcuate surface on a part, comprising a base, a first support means for carrying the part to be gauged, a gauge head having a work positioned contact, a second support means, means carrying said gauge head on said second support means for movement relative thereto about a pivot axis and movement of the gauging contact across the surface to be gauged, means carrying said first and second support means on said base for relative adjustment along two mutually perpendicular paths, drive means operatively connected to said gauge head carrying means for automatically oscillating said gauge head about its pivot axis, and indicating means operatively associated with said gauge head responsive to gauging movements of said work positioned contact.

4. An apparatus for gauging the radius of curvature of an arcuate surface on a part, comprising a base, two slide means carried on said base for sliding movement along mutually perpendicular paths, means to adjustably position each of said slide means relative to said base, means carried on one of said slide means for mounting a part in gauging position, carrying means pivotally mounted on the other of said two slides, a gauge head on said carrying means including a gauging contact, means operatively connected to said carrying means for oscillatory pivoting movements thereof and movement of said gauging contact across the surface to be gauged, and indicating means operatively connected to said gauging head and responsive to gauging movements of said gauging contact.

5. An apparatus for gauging the radius of curvature of an arcuate surface on a part, comprising a base, a first supporting means for supporting a part to be gauged, a gauge head including a gauging contact, a second supporting means, means mounting said gauge head on said second supporting means for movement of said gauging contact about a pivot axis and across the surface being gauged, said mounting means including means for relative adjustment between said gauge head and said mounting means, means carrying said first and second supporting means on said base for relative adjustment to locate the pivot axis of the gauging contact on a center of curvature of the surface being gauged, means operatively connected to the mounting means for oscillation of said gauge head and said gauging contact, and indicating means operatively connected to said gauge head responsive to gauging movements of said gauging contact.

6. An apparatus for gauging the radius of an arcuate surface on a part, comprising a base, means for supporting a part to be gauged, a gauging head including a gauging contact, means supporting said gauging head for movements of said gauging contact about a pivot axis and across the surface to be gauged, means carrying said supporting means on said base for relative adjustments with respect to each other to locate the pivot axis of the gauging contact on a center of curvature of the surface, drive means operatively connected to the supporting means for the gauging head for oscillation of said gauging head and said gauging contact, means in said drive means for adjusting the degree of oscillation and the frequency of oscillation, and indicating means operatively connected to said gauging head responsive to the gauging movement of said gauging contact.

7. An apparatus for gauging the radius of an arcuate surface on a part, comprising a base, first and second slide means carried by said base for sliding movement along mutually perpendicular paths, means to adjustably position said slide means relative to said base, means carried on the first of said slide means for mounting a part in gauging position, a gauge head including a gauging contact, carrying means pivotally mounted on the second of said slide means and carrying said gauge head, means operatively connected to the carrying means for the gauge head for oscillatory pivoting movements of said gauge head and movement of said gauging contact across the surface to be gauged including means for adjusting the extent of oscillation, means carried by said second slide means to indicate the degree of oscillation, and indicating means operatively connected to said gauge head responsive to gauging movements of said gauging contact.

8. An apparatus for gauging the radius of an arcuate surface on a part, comprising a base, means supporting a part to be gauged, gauging means including a gauging contact, means supporting said gauging means for movement of said gauging contact about a pivot axis and across the surface to be gauged, means carrying said supporting means on said base for relative adjustment along mutually perpendicular paths to locate the pivot axis of the gauging means on a center of curvature of the surface, crank means carried by the supporting means for the gauging means and operatively connected for movement of said gauging means and said gauging contact, reciprocating drive means, means connecting said reciprocating drive means to said crank means including means for adjusting the cranking radius and the degree of oscillation, and indicating means operatively connected to said gauging means responsive to gauging movement of said gauging contact.

9. An apparatus for gauging the radius of an arcuate surface on a part, comprising a base, first and second slide means carried from said base for relative sliding movement along two mutually perpendicular paths, screw means cooperating between said base and each of said slide means for adjustments thereof, means carried on the first slide means for positioning a part in gauging position and including clamp means therefor, mounting means carried by the second of said slide means for pivoting movements relative thereto, drive means operatively connected to said mounting means for oscillation thereof, means supporting said drive means on said second slide means, a gauge head having a work contactor, means fixing said gauge head to said mounting means for oscillatory movements of said work contactor across the surface to be gauged, and indicating means operatively connected to said gauge head responsive to gauging movement of said work contactor relative to said gauge head.

10. An apparatus for gauging the radius of an arcuate surface on a part, comprising a base, first and second supporting means carried on said base for relative adjustment along two mutually perpendicular paths, means carried by the first of said supporting means for supporting and clamping a part in a predetermined position for gauging, carrying means pivotally mounted on said second supporting means, crank means operatively connected to said carrying means, drive means carried by said second supporting means operatively connected to said crank means for oscillatory movements of said carrying means, indicating means cooperating between said second supporting means and said carrying means for indicating the degree of oscillation, gauging means carried by said carrying means for adjustment relative thereto, said gauging means including a gauging contact carried for movement across the surface to be gauged upon pivoting movement of said carrying means, and indicating means operatively connected to said gauging means responsive to gauging movements of said gauging contact.

11. An apparatus as set forth in claim 10 wherein said crank means includes adjustable means for varying the effective radius thereof and the degree of oscillation of said gauge head carrying means.

12. An apparatus for gauging the radius of an arcuate surface on a part, comprising a base, means for supporting a part to be gauged in gauging position, gauging means including a gauging contact, means carrying said gauging means for movement of said gauging contact about a pivot axis and across the surface to be gauged, said gauging means including two cooperating gauging components, one of which is operatively connected to said gauging contact and positioned by the surface being gauged, said supporting means including means for slidably positioning the part along said base, said carrying means including means for slidably positioning the pivot axis along said base in a path at right angles to the direction of adjustment of said part, drive means on said carrying means operatively connected to the gauging means for cyclic oscillation of said gauging means and said gauging contact during relative adjustments of the part and pivot axis, and indicating means operatively connected to said gauging means responsive to the relative displacement of the two gauging components.

13. An apparatus as set forth in claim 12 wherein said cooperating gauging components comprise a fluid leakage orifice and an opposing orifice controlling surface.

14. An apparatus as set forth in claim 13 wherein the means operatively connected for oscillation of said gauging means and said gauging contact include means for varying the degree of oscillation as desired and further including indicating means for indicating the degree of oscillation.

15. An apparatus for gauging the radius of an arcuate surface on a part, comprising a base, said base having a forward, vertically disposed mounting face thereon, a first slide, means carrying said first slide on the forward face of said base for horizontal adjustment, a second slide, means carrying said second slide on the forward face of said base adjacent said first slide and for vertical adjustment, a horizontal platform carried by said second slide and cantilevered across and adjacent the forward face of the first slide, means for adjusting the position of the first and second slides relative to the base, a shaft carried by said first slide extending perpendicular to the forward face of said base, said shaft being carried by said first slide for pivoting movements relative thereto and passing rearwardly through said base with clearance for horizontal adjustments relative to said base upon movements of said first slide, a gauge head having a work contactor, means carrying said gauge head on said shaft for pivoting movement therewith, work positioning and clamping means carried on said platform on the upper surface thereof, said platform having a longitudinal slot therein, the work contactor of said gauging means extending upward through said slot and into engagement with the surface to be gauged, and indicating means operatively connected to said gauging means and responsive to gauging movement of said gauging contact.

16. An apparatus for gauging as set forth in claim 15 further comprising a crank arm at the rearward end of said shaft, support means carried by said first slide at the rear of said base, and driving means carried by said support means and operatively connected to said crank for oscillation of said shaft to move said work contactor across a surface to be gauged.

17. An apparatus for gauging the radius of curvature of an arcuate surface on a part comprising means for supporting a part in gauging position, a gauging means, means carrying said gauging means for swinging movements about a pivot axis and along the arcuate surface, said gauging means comprising means continuously responsive to the distance between the arcuate surface and the pivot axis during movements of the gauging means about the pivot axis, means for independently relatively adjusting the part and the pivot axis in two directions at right angles to one another transverse the pivot axis, whereby the pivot axis can be positioned coaxially with a center of curvature of the arcuate surface being gauged, and indicating means continuously responsive to said gauging means to determine when the pivot axis and center of curvature of the arcuate surface coincide and variations in the radius of curvature of the surface gauged.

18. An apparatus for gauging the radius of curvature of an arcuate surface on a part comprising, means for supporting a part in gauging position, gauging means including a gauging contact, means supporting said gauging means for oscillatory swinging of said gauging contact about a pivot axis and across the surface being gauged, said gauging contact being positioned in its gauging movement toward and from the pivot axis in accordance with the distance between the pivot axis and arcuate surface during the swinging movement of the gauging contact, drive means operatively connected to said gauging contact to automatically move said gauging contact back and forth across the part surface in a cyclic manner, indicating means connected to said gauging means and including an indicator continuously responsive to gauging movements of the gauging contact, whereby the indication obtained is cyclicly variable when the pivot axis and center of surface curvature are relatively displaced, said supporting means including adjustable means for relatively adjusting the part and pivot axis while the drive means is cyclically operable so the center of surface curvature and the pivot axis can be placed in concentric relationship and when a constant indicator response is obtained the radius of curvature of the surface is indicated.

19. A method for accurately positioning the pivot axis of a swingable gauging contact controlling an indicator responsive to gauging movements of the contact along a line radial to the pivot axis so the pivot axis can be positioned in concentric relationship with an arcuate surface on a part and the radius of curvature of the surface can be gauged, said method comprising, continuously and cyclicly swinging the gauging contact about its pivot axis and back and forth along the arcuate surface, relatively adjusting the pivot axis and part in a path parallel to a line tangent to the arcuate surface to obtain an equal indicator response to each extreme displacement of the gauging contact in its movement and to thus locate the pivot axis to intersect a straight line extending through the center of curvature of the surface and intersecting the surface, relatively adjusting the pivot axis and part along said line until the indicator response is constant during continued swinging of the gauge contact across the surface indicating that the pivot axis and axis of curvature are then concentric, and comparing this constant indicator response with that obtained with a master or setting member.

References Cited in the file of this patent

UNITED STATES PATENTS

| | | |
|---|---|---|
| 2,479,606 | Douglass | Aug. 23, 1949 |
| 2,599,835 | Johnson et al. | June 10, 1952 |
| 2,621,416 | Brenneke | Dec. 16, 1952 |

FOREIGN PATENTS

| | | |
|---|---|---|
| 623,050 | Great Britain | May 11, 1949 |

UNITED STATES PATENT OFFICE
CERTIFICATE OF CORRECTION

Patent No. 2,796,671

June 25, 1957

Willis Fay Aller

It is hereby certified that error appears in the above numbered patent requiring correction and that the said Letters Patent should read as corrected below.

In the grant, line 3, and in the heading to the printed specification, line 6, State of incorporation, for "Ohio" read -- Delaware --.

Signed and sealed this 29th day of October 1957.

(SEAL)
Attest:

KARL H. AXLINE
Attesting Officer

ROBERT C. WATSON
Commissioner of Patents